United States Patent
Fouladi Fard et al.

(10) Patent No.: US 12,222,872 B1
(45) Date of Patent: Feb. 11, 2025

(54) METHOD AND APPARATUS FOR GENERATING A HISTOGRAM

(71) Applicant: EIDETIC COMMUNICATIONS INC., Calgary (CA)

(72) Inventors: Saeed Fouladi Fard, Calgary (CA); Stanley Jonathan Eskritt, Airdrie (CA); Philip Chan, Calgary (CA); Sean Gregory Gibb, Calgary (CA)

(73) Assignee: Eidetic Communications Inc., Calgary (CA)

( * ) Notice: Subject to any disclaimer, the term of this patent is extended or adjusted under 35 U.S.C. 154(b) by 0 days.

(21) Appl. No.: 18/394,477

(22) Filed: Dec. 22, 2023

(51) Int. Cl.
*G06F 12/00* (2006.01)
*G06F 12/1018* (2016.01)

(52) U.S. Cl.
CPC ............... *G06F 12/1018* (2013.01)

(58) Field of Classification Search
CPC .. G06F 12/1018; G06F 16/137; G06F 16/152; G06F 16/2255; G06F 16/325; G06F 16/9014
See application file for complete search history.

(56) References Cited

U.S. PATENT DOCUMENTS

| | | | |
|---|---|---|---|
| 2012/0047181 A1* | 2/2012 | Baudel | G06F 16/2246 707/E17.012 |
| 2016/0239528 A1* | 8/2016 | Pemberton | G06F 16/211 |
| 2019/0146713 A1* | 5/2019 | Ben Dayan | G06F 3/0659 711/103 |

* cited by examiner

*Primary Examiner* — Arvind Talukdar
(74) *Attorney, Agent, or Firm* — Borden Ladner Gervais LLP; Todd Keeler

(57) ABSTRACT

A method and apparatus for generating a histogram includes receiving an input key, determining if a linked-list node associated with the input key exists in the linked-list memory, in response to determining that a linked-list node associated with the input key does exist in the linked-list memory, increasing at least one count stored in the linked-list node associated with the input key, in response to determining that a linked-list node associated with the input key does not exist in the linked-list memory, determining if an available slot exists in the key storage memory, in response to determining that an available slot does not exist in the key storage memory determining a reclaimed slot in the key storage memory and a reclaimed node in the linked-list memory that is associated with the reclaimed slot, transmitting the data stored in the reclaimed slot in the key storage memory and the at least one count associated with the data stored in the reclaimed slot to an external device, and storing the key input in the reclaimed slot in the key storage memory and creating a new linked-list node associated with the reclaimed slot in the linked-list memory having at least one count.

20 Claims, 4 Drawing Sheets

METHOD AND APPARATUS FOR GENERATING A HISTOGRAM

FIELD

The present disclosure relates generally to method and apparatus for a generating histogram.

BACKGROUND

A histogram is a visual summary of data distribution that provides a summary of occurrence frequencies of different data points. Data histogram generation has a wide range of applications across many fields. In data analysis, histograms are used to understand the distribution and frequency of data values. Histograms may assist in identifying patterns, outliers, and anomalies in datasets. Histograms are used in statistical analysis to visualize and interpret data distributions. Histograms are also utilized in performance analysis to examine response times, latency, or throughput, and optimizing system performance. Additionally, histograms have extensive applications in quality control, image processing, market research, and financial analysis.

In some applications, data histograms need to be calculated over very large amounts of data. In big data analytics, organizations often deal with massive datasets that can span terabytes or even petabytes. There, histograms are used for analyzing the data values and gaining insights from such large-scale datasets, such as, for example, millions of transactions in social media data. Network traffic data analysis is another domain where histograms are used over large volumes of data to analyze network traffic patterns, identify anomalies, detect network attacks, and optimize network performance. Genomic data analysis, particle physics experiments, and sensor data analysis are other example applications where histograms of large data sets are needed.

Computational Storage (CS) refers to a storage architecture that incorporates computational resources such as embedded processors or other hardware computational units. Computational storage brings compute capabilities closer to the storage devices, reducing data movement and improving overall system performance. Computational storage has a wide range of applications and use cases, particularly those with high-performance and low-latency requirements, such as real-time analytics, artificial intelligence, edge computing, and cloud infrastructure.

A challenge with using CS to generate histograms, particularly in large data sets, is that the number of bins in the histogram may be unknown or unbounded, and therefore the amount of storage required is unfeasible using conventional histogram generating techniques. An example of this is network traffic analysis where storage of large volumes of data for future analysis is not feasible due to storage limitations.

Further, in addition to storage demands, in many cases data histograms need to be calculated at high speeds to keep up with the volume of processed data. However, as the amount of storage increases, the speed at which data histograms can be processed goes down, making calculating data histograms for large data sets at high speeds challenging.

Improvements to data histogram generation are desired.

SUMMARY

It is an object of the present disclosure to obviate or mitigate at least one disadvantage of previous systems and method for generating histograms.

In a first aspect, the present disclosure provides a method of generating a histogram at a histogram engine having a linked-list memory and key storage memory, the method including receiving an input key, determining if a linked-list node associated with the input key exists in the linked-list memory, in response to determining that a linked-list node associated with the input key does exist in the linked-list memory, increasing at least one count stored in the linked-list node associated with the input key, in response to determining that a linked-list node associated with the input key does not exist in the linked-list memory, determining if an available slot exists in the key storage memory, in response to determining that an available slot does not exist in the key storage memory: determining a reclaimed slot in the key storage memory and a reclaimed node in the linked-list memory that is associated with the reclaimed slot, transmitting the data stored in the reclaimed slot in the key storage memory and the at least one count associated with the data stored in the reclaimed slot to an external device, and storing the key input in the reclaimed slot in the key storage memory and creating a new linked-list node associated with the reclaimed slot in the linked-list memory having at least one count.

In a further embodiment, determining if a linked-list node associated with the input key exists includes performing a hash operation on the received input key to generate an input hash, determining a node address based on the input hash, and determining that a linked-list node for the input key exists when the node address of the input hash matches a stored linked-list node stored in the linked-list memory.

In a further embodiment, the LL memory includes a LL root memory configured to store $2^s$ LL nodes, and determining the node address based on the input hash comprising extracting s bits of the input hash, the extracted s bits of the input hash forming the node address, and the remaining bits of the input hash after extracting the s bits forming the remainder, and determining that a linked-list node for the input key exists comprises determining that a linked-list node for the input key exists when the node address of the input hash matches a stored linked-list node stored in the LL root memory.

In a further embodiment, determining if a linked-list node for the input key exists in the linked-list memory comprises determining that a linked-list node exists if the remainder of the input hash match a stored remainder in a node stored in the linked-list memory that is associated with the node address.

In a further embodiment, receiving the key includes receiving the input key and an associated table value, and wherein performing a hash operation on the input key comprises concatenating the input key and table value and performing a hash operation on the concatenated input key and the table value to generate the input hash.

In a further embodiment, the method further includes storing a sequence list in a sequence memory of the histogram engine, the sequence list indicating one or more of a sequence in which the slots of the key storage memory have been accessed, a sequence in which key frequency count value associated with the slots have been updated, and a slot having an associated key frequency count value that is higher than a key frequency count value of the other slots, and the processor configured to determine the reclaimed slot comprises determining a reclaimed slot based on the sequence list.

In a further embodiment, the method further includes storing a list of available slots in the key storage memory in an available slot memory of the histogram engine, and determining if an available slot exists comprises determining if any available slots are included in the list of available slots.

In a further embodiment, in response to determining that no subsequent input keys have been received after a predetermined time period after receiving the input key determining a plurality of slots of the key storage memory to reclaim, for each of the plurality of reclaimed slots, transmitting the data stored in the reclaimed slot in the key storage memory and the at least one count associated with the data stored in the reclaimed slot to an external device, and adding the plurality of reclaimed slots to the list of available slots stored in the available slot memory.

In a further embodiment, receiving the input key includes receiving the input key and at least one count value associated with the input key, increasing the at least one count stored in the linked-list node comprises increasing the at least one count stored in the linked-list node by the at least one count values, and creating a new linked-list node associated with the reclaimed slot in the linked-list memory having at least one count comprises setting the at least one count of the new linked-list node to the at least one count value.

In a further embodiment, the external device is a second histogram engine or an external memory.

In further aspect, the present disclosure provides an apparatus for generating a data histogram that includes a linked-list memory and a key storage memory, at least one processor configured to receive an input key, determine if a linked-list node associated with the input key exists in the linked-list memory, in response to determining that a linked-list node associated with the input key does exist in the linked-list memory, increase at least one count stored in the linked-list node associated with the input key, in response to determining that a linked-list node associated with the input key does not exist in the linked-list memory, determine if an available slot exists in the key storage memory, in response to determining that an available slot does not exist in the key storage memory: determine a reclaimed slot in the key storage memory and a reclaimed node in the linked-list memory that is associated with the reclaimed slot, transmit the data stored in the reclaimed slot in the key storage memory and the at least count stored in the reclaimed node associated with the data stored in the reclaimed slot to an external device, and store the key input in the reclaimed slot in the key storage memory and creating a new linked-list node associated with the reclaimed slot in the linked-list memory having at least one count.

In a further embodiment, the at least one processor is configured to determine if a linked-list node associated with the input key exists comprises the at least one processor configured to perform a hash operation on the received input key to generate an input hash, determine a node address based on the input hash, and determine that a linked-list node for the input key exists when the node address of the input hash matches a stored linked-list node stored in the linked-list memory.

In a further embodiment, the linked-list memory includes a linked-list root memory configured to store $2^s$ linked-list nodes, the one or more processors configured to determine the node address based on the input hash comprises the processor being configured to extract s bits of the input hash, the extracted s bits of the input hash forming the node address, and the remaining bits of the input hash after extracting the s bits forming the remainder, and wherein the one or more processors configured to determine that a linked-list node for the input key exists comprises the one or more processors configured to determine that a linked-list node for the input key exists when the node address of the input hash matches a stored linked-list node stored in the linked-list root memory.

In a further embodiment, the one or more processors configured to determine if a linked-list node for the input key exists in the linked-list memory comprises the one or more processors being configured to determine that a linked-list node exists if the remainder of the input hash matches a stored remainder in a node stored in the linked-list memory that is associated with the node address.

In a further embodiment, the one or more processors configured to receive the key includes the one or more processors being configured to receive the input key and an associated table value, and wherein the one or more processors configured to perform a hash operation on the input key comprises the one or more processors being configured to concatenate the input key and table value and perform a hash operation on the concatenated input key and the table value to generate the input hash.

In a further embodiment, the apparatus further includes a sequence memory, the one or more processors are further configured to store a sequence list in the sequence memory, the sequence list indicating one or more of a sequence in which the slots of the key storage memory have been accessed, a sequence in which key frequency count values associated with the slots have been updated, and a slot having an associated key frequency count value that is higher than a key frequency count value of the other slots, and the processor configured to determine the reclaimed slot comprises determining a reclaimed slot based on the sequence list.

In a further embodiment, the apparatus further includes an available slot memory, the at least one processor further configured to store a list of available slots in the key storage memory in the available slot memory of the histogram engine, wherein the at least one processor configured to determine if an available slot exists comprises the at least one processor configured to determine if any available slots are included in the list of available slots.

In a further embodiment, the at least one processor is further configured to, in response to determining that no subsequent input keys have been received after a predetermined time period after receiving the last input key comprises the at least one processor configured to determine a plurality of slots of the key storage memory to reclaim, for each of the plurality of reclaimed slots, transmit the data stored in the reclaimed slot in the key storage memory and at least one count associated with the data stored in the reclaimed slot to an external device, and add the plurality of reclaimed slots to the list of available slots stored in the available slot memory.

In a further embodiment, the at least one processor configured to receive the input key comprises the at least one processor configured to receive the input key and at least one count value associated with the input key, the at least one processor configured to increasing the at least one count stored in the linked-list node associated with the input key comprises the at least one processor configured to increase the at least one count stored in the linked-list node by the at least one count value, and the at least one processor configured to create a new linked-list node associated with the reclaimed slot in the linked-list memory having at least one count comprises the at least one processor being configured to set the at least one count of the new linked-list node to the at least one count value.

In a further embodiment, the external device is a second histogram engine or an external memory.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
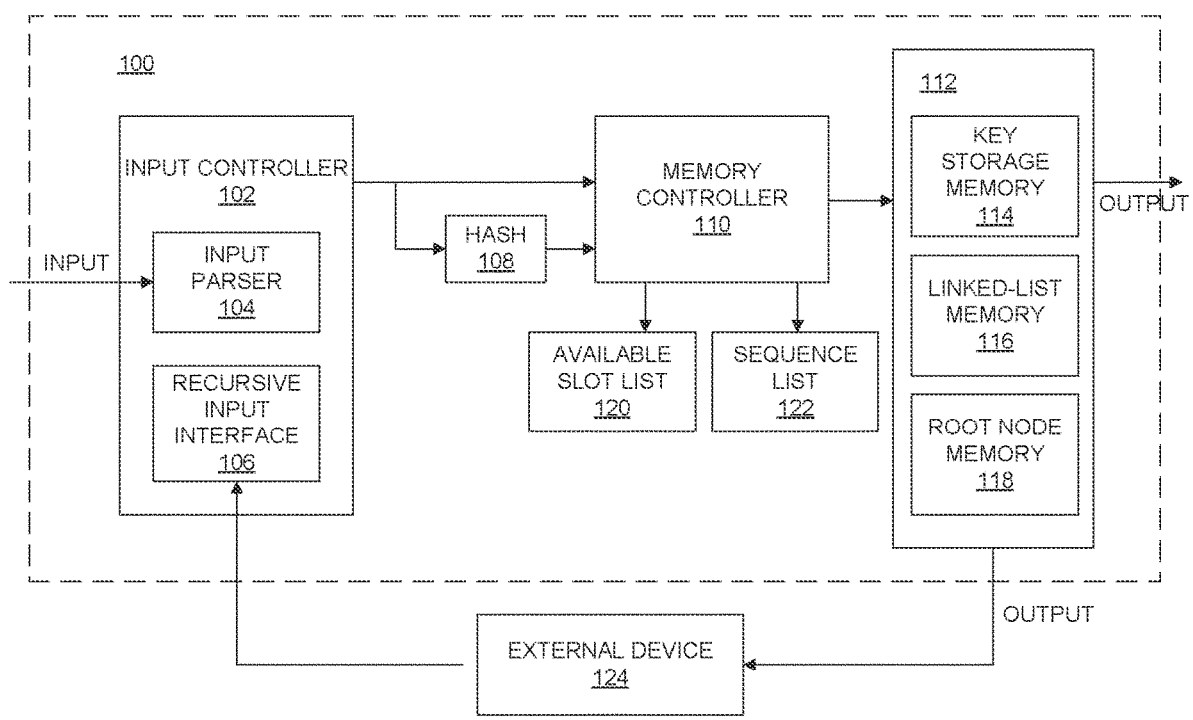
FIG. 1 is a schematic diagram of an example histogram engine in accordance with an embodiment of the present disclosure.

Generally, the present disclosure provides a method and apparatus for a histogram engine that utilizes a constrained linked-list (LL) to keep track of the number of times each unique input key is observed, where each unique input key corresponds to a distinct "bin" of the data histogram. When the constrained LL becomes full, storage space is reclaimed in the LL, and stored data associated with the reclaimed LL nodes is output to external devices. By chaining multiple such histogram engines together, a multi-staged calculation of data histograms may be provided where the early stages of the chain are configured with less storage capacity for high-speed updates, while the later stages are configured with more storage for higher capacity.

Such chaining of histogram engines as disclosed herein provides the large storage capacity for data histogram generation over large datasets having unbounded keys, while also providing high processing speed needed for processing such large volumes of data, in order to address the challenges in generating data histograms, particularly for large data sets, using conventional means.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled, or referred to, as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium can include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows that can be performed by an apparatus, can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (for example, a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

Referring now to FIG. 1, and a schematic diagram of example histogram engine 100 is shown. The example histogram engine 100 includes an input controller 102, which includes an input parser 104 and recursive input interface 106. The input parser communicates with an external source of input data such as, for example, a host CPU. The input parser 104 receives input data from an external data source. The host may be, for example, a host CPU of an overall system, such as a CS system, in which the histogram engine 100 is included.

The input includes keys. Each key essentially represents a distinct bin in the histogram and may be arbitrary lengths of data bits or bytes. The input may also include, for each key, a table value. Table values enable the histogram engine 100 to measure different histograms for various data concurrently. For example, histogram engine 100 generates data histograms for different data types, such as, for example, data packet types, data sources, and data destinations by setting a unique table index for each data type. Each key in the input is received together with an associated table value that indicates which data type that key belongs to. The input may also include a set of counts for each input key. The set of counts may be utilized to measure different properties of a particular key. For instance, the set of counts may include a first count for measuring the length of each packet, and a second count for measuring the number of times that key has been observed, which may in general be referred to as the count for that key or the "key frequency". If no counts are included with the input, then only the counter associated with the key frequency is incremented by 1.

Input is typically received in form of an input stream. The input parser 104 may include a queue for the input that is received in the input stream. The queue may be a buffer memory (not shown) in which input is stored. The buffer memory may be any suitable type of memory including, for example, a first-in-first-out memory (FIFO).

The recursive input interface 106 is the same as the input parser with the additional functionality that the recursive input interface 106 may also receive a set of count values associated with the key and an associated table value that is received with input. The recursive input interface 106 may be utilized to enable the histogram engine 100 to receive the output of another histogram engine, as discussed in more detail later on.

The input controller 102 communicates with a hash generator 108 and a memory controller 110. The memory controller 110 is configured to control a memory 112, that includes a key storage memory 114, a linked-list (LL) memory 116, and an LL root node memory 118. Together, the LL root node memory 118 and the LL memory 116 store all of the linked-list nodes. Although the memory 112, including the key storage memory 114, the LL memory 116, and the LL root node memory 118 are shown in FIG. 1 as a single memory, the memory 112 may be provided by any number of suitable memory components. For example, each of the key storage memory 114, LL memory 116, and LL root node memory 118 may be provided by separate memory components.

In the present disclosure, the histogram engine 100 utilizes a constrained linked-list (LL) to keep track of keys. This LL is created to keep track of the number of times, or key frequency, that an input key has been observed in addition to other properties for each key. Each node created in the LL memory 116 and LL root node memory 118 relates to a unique key/table, with the corresponding key/table being stored in a corresponding slot in the key storage memory 114, as described in more detail below.

The memory controller 110 is also in communication with an available slot list 120 and a sequence list 122. The available slot list 120 stores a list of available slots in the key storage memory 114. As slots in the key storage memory 114 are used, they are removed from the available slot list 120, and as new slots in the key storage memory 114 become available, they are added to the available slot list.

The sequence list 122 may include a double linked-list of slot numbers that tracks the sequence in which slots of the key storage memory 114 are used. Each unique input key has an associated slot number in the key storage memory. Any time an input key is processed its slot number is moved to the head of the linked-list stored in the sequence list 122. The sequence list 122 may also track the slot that stores the input key having the highest access frequency. Any time a key frequency value is updated, if the key frequency value is higher than the previous maximum key frequency value, then the slot number associated with that key frequency value is set to slot number having the highest count.

The example histogram engine 100 shown in FIG. 1 may be hardware implemented or software implemented. In a hardware implementation, the functionality of the input controller 102, the hash generator 108, the memory controller 110, the available slot list 120, and the sequence list 122 may each be provided by a separate, suitably configured hardware component, such as an ASIC or FPGA component. In a software implementation, the functionality of the input controller 102, the hash generator 108, the memory controller 110, the available slot list 120, and the sequence list 122 may be provided by executing software code by a processor. In software implementations, each of the input controller 102, the input parser 104, the recursive input interface 106, the hash generator 108, the memory controller 110, the available slot list 120, and the sequence list 122 can be, for example, software modules that are executed by a processor to provide the functionality of these elements.

Each of the hardware and software implementations have associated advantages and disadvantages. For example, hardware implementation may benefit from parallel processing across multiple logical elements, but may be limited in terms of available high-speed storage. Conversely, software implementations often have access to more memory than hardware implementations, but are constrained by processing power.

As described in greater detail with reference to FIG. 3, embodiments of the present disclosure may leverage the strengths of both hardware and software implementations, mitigating the limitations inherent in each, by chaining together hardware and software implemented histogram engines.

The following describes the functionality of the example histogram engine 100 from a hardware perspective. However, a software implementation follows the same data processing steps. The implementation of each processing step may be tailored to optimize the utilization of resources on the specific platform. For example, in a software implementation, storage tables and buffers may be sized larger than in a hardware implementation to capitalize on the available memory resources, whereas in a hardware implementation, parallelism techniques are employed to enhance processing speeds.

When a new key, i.e., a key for which no node already exists in the LL root node memory 118 and the LL memory 116, is received at the input controller, a new node is created. This new node also includes a count value which is set to one if the input does not include any count values. When the input includes a set of count values, the new LL node will be created include counters for each input count value.

When an input key/table value is received for which a node already exists in the LL, it can be determined that this key/table has been received previously sometime in the past. If the input does not include a set of count values, then the first count value of the corresponding LL node is increased by 1. If the input does include a set of count values, then the count values in the LL node are increased by the corresponding values included in the set of counts received in the input.

As discussed previously unbounded linked lists may not be feasible in practice depending on a) the distribution of input keys and b) availability of storage resources. As it will be explained later, an iterative approach is disclosed to mitigate the effects of resource limitations.

In general, the input received at the input controller 102 is a stream of keys, and in some cases associated table values and/or a set of count values. A hash is calculated for each key/table value, which involves the hash generator 108 performing a hash operation over the combined key and table value. Any suitable hash operation may be utilized. The generated hash is then passed to the memory controller 110 for further processing.

In an embodiment, s hash bits of the generated hash of a key/table value are utilized as the LL address in the LL root node memory 118 for the node associated with the key/table value, where s is determined by the size, $2^s$, of the LL root node memory 118. For example, the last s bits of the generated hash form the LL address. The hash bits of the generated hash other than the s hash bits used for the LL address are referred to as the remainder.

In this way, the LL nodes are stored in either LL root node memory 118 or the LL memory 116. The LL root node memory 118 is used to store the root nodes of the LL and is addressed using a selected number, s, of hash bits as previously described. Up to $2^s$ nodes can be stored in the LL root. Because many different key/table inputs can result in a generated hash having the same s hash bits used for addressing, the nodes that share the same s bit hash addresses with an LL node in the root but have different hash values, are stored in the LL memory 116 and may be referred to as overflow LL nodes. Note that the root nodes are filled in first if the associated entry in the root memory is empty.

In an embodiment, each LL node, either stored in the LL root node memory 118 or the LL memory 116, stores, for example, one or more counts, the remainder of the generated hash after extracting the s hash bits for addressing, and the slot number of the key storage memory 114 for the key/table value associated with the LL node. Because the root node is stored in the LL root node memory 118 and overflow LL nodes are stored in the LL memory 116, a LL node may also include an address pointer to a LL memory 116 address of a next overflow LL node in the linked list of nodes having the same s bit address, and a validity flag which indicates that a next overflow LL node exists.

The input keys, the table values, and the length of each key are stored in the key storage memory 114. The key storage memory 114 may be divided into different slots of the same size which are made large enough to store the largest keys and associated data.

Because each LL node stores the slot number in the key storage memory 114 in which the key and table value are stored, the LL root memory and the LL memory together are made large enough to host as many LL nodes as there are slots, K, in the key storage memory 114.

To determine whether a LL node exists for a particular input key and table value already, the memory controller 110 may check the address in the LL root node memory 118 for a LL node using the s bits of the generated hash for the input key and table value. If no LL node exists at the address in the LL root node memory 118, then it is determined that a new LL node should be created. If there is a LL node stored at the address in the LL root node memory 118, then the memory controller 110 compares the remainder of the generated hash for the input key and the table value with the stored remainder data in the LL node stored in the LL root node memory 118 and, if applicable, the overflow LL nodes stored in the LL memory 116. If a match of the remainders is found in a LL node, then it is determined that a LL node for the key/table value exists and the count or counts of that LL node are increased. If none of the remainders stored in the LL nodes matches the remainder of the key/table value, then it is determined no LL node exists and a new LL node is generated.

As discussed previously, the processing speed of the histogram engine 100 slows down as the size of memory 112 increases due, at least in part, to the time required to search through a larger memory for LL nodes for each input key/table value. However, an issue with a reduced memory is that the capacity for the histogram engine 100 to maintain counts for unique keys/table values is reduced as the available LL memory 116 and slots in the key storage memory 114 are filled.

In the present disclosure, this problem of how to generate data histograms for a large, and potentially unbounded, number of unique keys at a processing rate that is high enough to make the generation feasible is addressed by utilizing an iterative process in which slots in the key storage memory 112, and the associated spaces in the LL memory 116 and LL root node memory 118 can be reclaimed. The key/table value in the reclaimed slot of the key storage memory 114 and the counts stored in the LL memory 114 or the LL root node memory 118 being reclaimed are sent to an external device 124. The external device 124 may be a further histogram engine, similar to histogram engine 100, or may be an external memory.

Although a single external device 124 is shown in the example of FIG. 1, in practice there may be multiple external devices 124 that are utilized to receive the data associated with the reclaimed slots. One example of a system that includes multiple external devices 124 is described later with reference to FIG. 3. Because the function of the external device 124 is to handle the overflow from the histogram engine 100, processing speed may not be as important in the external device 124, and the external device may be, for example, a software implemented histogram engine to take advantage of the increased storage capacity of a software implementation.

Figure 2A:
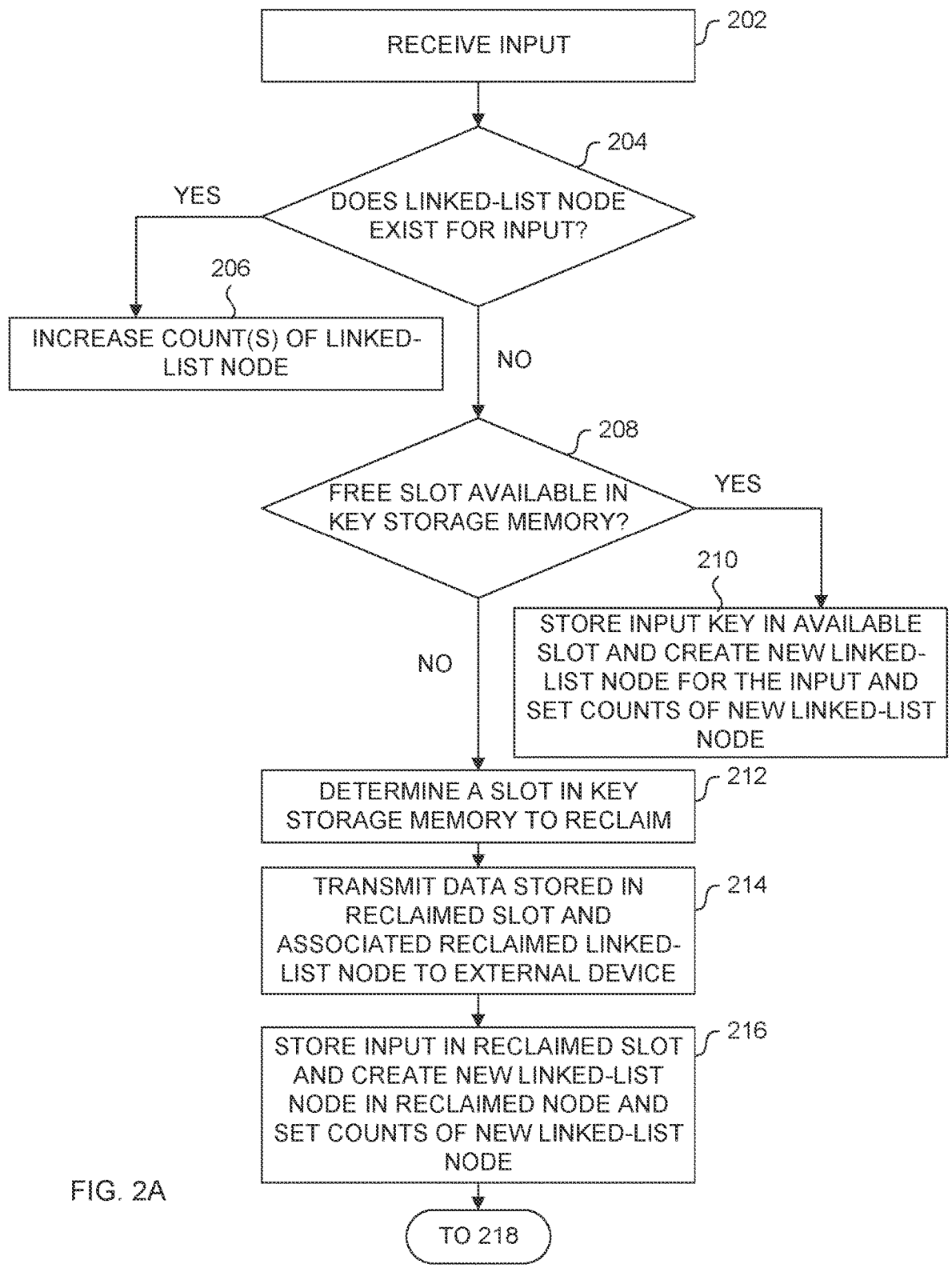
FIGS. 2A and 2B are a flow chart showing a method for generating a data histogram in accordance with an embodiment of the present disclosure.
Figure 2B:
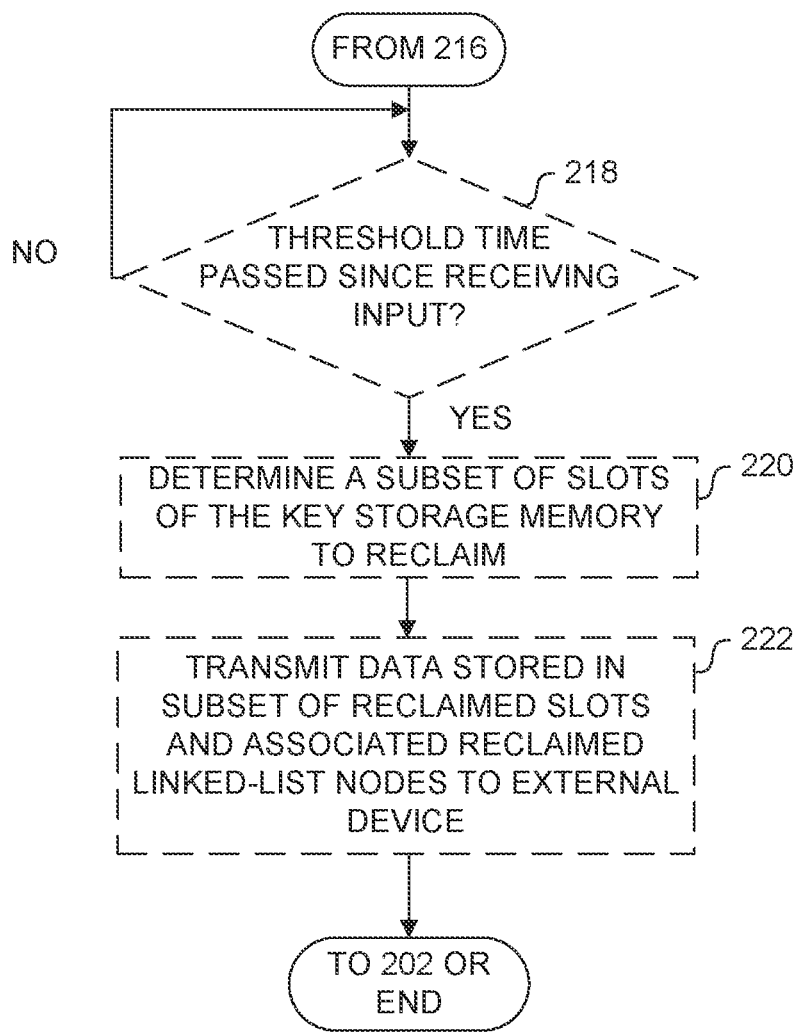

Referring to FIGS. 2A and 2B, a flowchart illustrating an example method for generating a data histogram by a histogram engine, such as the example histogram engine 100 described previously, is provided. The example method illustrated by the flowchart in FIGS. 2A and 2B utilizes reclaiming slots of a key storage memory, such as the key storage memory 114 of the example histogram engine 100, and the associated LL node of a LL memory, such as the LL root node memory 118 and the LL memory 116 of the example histogram engine 100 described previously. The method may be performed by a histogram engine, such as, for example, the example histogram engine 100 described previously with reference to FIG. 1. The operations of the computer implemented method may be performed by processors, such as, for example, the processors in the input controller 102, the hash generator 108, and the memory controller 110 of the example histogram engine 100 described previously, or by a CPU performing functions described previously with respect to the example histogram engine 100 by executing computer readable code stored in memory, the computer readable code embodied as, for example, software modules as described previously for a software implemented histogram engine 100.

At 202, input is received. The input may be received at an input controller such as, for example, the input controller 102 of the example histogram engine 100 described with reference to FIG. 1. The input may comprise an input key. The input may further comprise a table value associated with the input key. The input key and associated table value may be received from an external source, such as, for example, a host CPU of a system that extracts the input keys, comprising data of interest, from raw data, and includes a corresponding table number for each extracted input key.

The input may also include a set of counts associated with the input key. For example, if the input is received from another external device, such as another histogram engine or external memory storage corresponding to a histogram engine, the received input may include an input key and a set of count values associated from the input key, where the count values may have been determined during previous iterations of generating the data histogram, as described in more detail later. In some examples, the set of input counts received in the input correspond with different properties of the input key. In an example in which the input key relates to a particular product, the different count values included in the set of counts received in the input may be, for example, a count value associated with a number of customers who purchased that product and another count value associated with the amount spent on the particular product.

Receiving the input may comprise temporarily storing the input in a buffer memory provided by, for example, a FIFO associated with the histogram engine. A buffer memory enables the histogram engine to receive bursts of input stream that is arriving at a rate faster than the histogram engine is able to process at the input.

At 204, a determination whether a linked-list (LL) node exists in the histogram engine for the input is made. As described previously, the process for determining whether a LL node exists for a received input key may comprise generating a hash for the input key. If a table value is included in the input, then the input key and the associated table value are concatenated, and the hash is generated for both the input key and table value. S hash bits of the generated hash may be utilized as an address in the LL root node memory of the histogram engine, such as the LL root node memory 118 of the example histogram engine 100 described previously. Using the s bit address, a search is performed in the LL root node memory and, if necessary, in the LL memory of the histogram engine, such as the LL memory 116 of the example histogram engine 100 described previously. The search may comprise comparing a remainder of the hash generated from the input key and associated table value after extracting the s bit for addressing to the remainders stored in the LL nodes associated with the s bit address.

If a match is found, then it is determined at 204 that a LL node does exist, i.e., "YES" at 204. In this case, the process continues to 206 and the count values of the stored LL node associated with the input key are increased. In examples in which a set of count values is received with the input at 202, the counts of the stored LL node may be increased based on the corresponding count values included in the set. In examples in which no count values are received in the input at 202, then the key frequency count of the stored LL node may be increased by 1. From here, the process may end or may continue back to 202 to process further input.

If no match is found after comparing the remainder of the generated hash to the stored remainders of the LL nodes associated with the s bit address, then it is determined at 204 that no LL node exists, i.e., "NO" at 204. In this case, the process continues to 208 and a determination of whether there is a slot available in the key storage memory of the histogram engine, such as the key storage memory 114 of the example histogram engine 100 described previously. In an example, the histogram engine may include a stored available slot list that includes slot numbers of available slots in the key storage memory. In this case, the determination at 208 may be performed by determining if the available slot list includes any available slots. Alternatively, the determination at 208 may include searching the key storage memory 114 for available slots.

In some embodiments, a number of slots of the key storage memory may be reserved for processing bursts of received input data. In these cases, available slots may be listed in the available slot list, but such slots are only made available if a burst condition is met. Reserving a set of slots to process a burst of inputs facilitates processing bursts of input more quickly by avoiding the time spent reclaiming slots of the key storage memory. A burst condition may be determined, for example, when the input data stored in a buffer memory associated with the input controller of a histogram engine reaches a threshold amount. In these embodiments, the determination of whether there is an available slot in the key storage memory may comprise determining whether a burst condition is met, and if not whether there are any available slots that are not reserved for a burst, and if the burst condition is met, whether any slots are available including the reserved slots.

If an available slot in the key storage memory is determined at 208, the process moves to 210 by creating a new LL node in the LL root node memory or in the LL memory and storing the input key and associated table value in the key storage memory, as described previously. The LL node may store the remainder hash bits of the generated hash, the one or more count values, and the slot number of the slot in the key storage memory that stores the associated input key and table value. If no count value is included in the input received at 202, then the frequency count value in the newly created LL node is set to 1. If a count value or set of count values is received with the input at 202, then the counts in the newly created LL node are set to the corresponding count values in the set of counts included in the input received at 202. Creating a new LL node at 210 may include updating a previous LL node in the LL associated with the s bit address to point to the newly created LL node, which may have been the last LL node in the LL.

If no available slots are determined at 208, the process moves to 212 by determining a slot in the key storage memory to reclaim. In most applications, a data histogram is generated to understand the distribution of the main body of the data, or to measure the frequency of the rarest events. An example of an application in which the main body of the distribution may be more important is a network traffic monitoring application in which the distribution of IP sources in the network trafficking data is of interest. An example of an application in which the rarest events may be important is measuring the frequency of large Gaussian noise magnitudes. The determination at 208 of which slots to reclaim may be informed by the context in which the data histogram is being generated and whether the most frequently occurring keys, or the least frequently occurring keys are of most interest.

In some embodiments, the determination at 212 of which slot to reclaim is made based on the time elapsed since data was stored in the slots of the key storage memory, referred to as the time since the slot was last accessed. For example, the "oldest slot", being the slot that was accessed furthest back in time from the present time, is reclaimed. Conversely, in other embodiments, a "youngest slot" may be reclaimed.

In other embodiments, the determining a slot to reclaim at 212 may be performed based on the count value associated with the key frequency of input keys stored in the key storage memory. For example, a slot storing the input key with the highest key frequency, i.e., the largest key frequency count value, may be reclaimed. In another example, the slot associated with the input key for which the key frequency count has not increased for the longest period to time may be reclaimed.

In examples in which the histogram engine maintains an access sequence list, such as the sequence list 122 of the example histogram engine 100 described previously with reference to FIG. 1, then determining a slot to reclaim at 212 may be performed with reference to the access sequence list stored in the sequence list. The access sequence list may include, for example, one or more of the sequence over time that slots have been accessed, the sequence over time of the last update of the count values associated with the keys stored in the slots, and the slot being associated with the highest key frequency count value.

In general, slots that are expected to contain keys of less interest, based on, for example, the time since the key was last accessed, or time since a count value associated with the key stored in the is updated, or the slots associated with the highest or lowest key frequency count values, may be reclaimed at 212, while slots storing keys expected to be of interest based on the application are retained in the histogram engine.

Once a reclaimed slot is determined at 212, the data stored in the slot, for example the input key and the table value, as well as the associated count values stored in the LL root node memory or the LL memory, are transmitted to an external device at 214. The external device to which the reclaimed data is transmitted to may be similar to the external device 124 described previously with reference to FIG. 1. The external device may be a further histogram engine, which receives the transmitted key, table value, and count values as input, similar to 202 described previously. The external device may also be a storage device that stores the key, table value, and count values.

At 216, a new LL node is created by storing the input, including the input key and associated table value, in the reclaimed slot in the key storage memory and storing the LL node data in the reclaimed portion of the LL root node memory or the LL memory. Creating the new node may comprise updating, as necessary based on the creation of the LL node, the other LL nodes that were previously linked to the reclaimed portion of the LL root node memory or the LL memory.

In some embodiments, slots of the key storage memory may be reclaimed during periods of inactivity such that a set of slots of available to more quickly process future bursts of input without having to spend time and computational resources reclaiming slots. These reclaimed slots may be reserved for burst conditions, as described previously, or may be available generally.

In these embodiments, a determination is made at 218 whether a threshold time has elapsed since receiving a last input. If the threshold time has not passed, i.e., "NO" at 218, then the process may wait further for input to be received.

If the determination at 218 is that a threshold time has passed since a last input was received, i.e., "YES" at 218, then the process proceeds to 220 to determine a subset of slots of the key storage memory to reclaim.

The determination at 220 may be performed substantially similarly to the determination at 212, as described previously. The number of slots that are reclaimed may be predetermined, or may be based on a set of criteria. The criteria may be, for example, the slots not accessed in a predetermined amount of time, or having an associated count value greater or less than a predetermined value. If the reclaimed slots are intended to be kept in reserve for a burst condition, the number of slots reclaimed may be based on balancing the resources and time saved by having slots in reserve to process bursts of input with the diminished storage capacity of the histogram engine when not in a burst condition.

At 222, the data stored in the reclaimed slots, and the count values stored in the LL root node memory or LL memory, are transmitted to an external device. The transmitting at 222 may be performed substantially similarly to the transmitting at 214 described previously. Transmitting the data at 222 may include updating any other LL nodes that are linked to the LL nodes associated with the reclaimed slots, as previously described.

Figure 3:
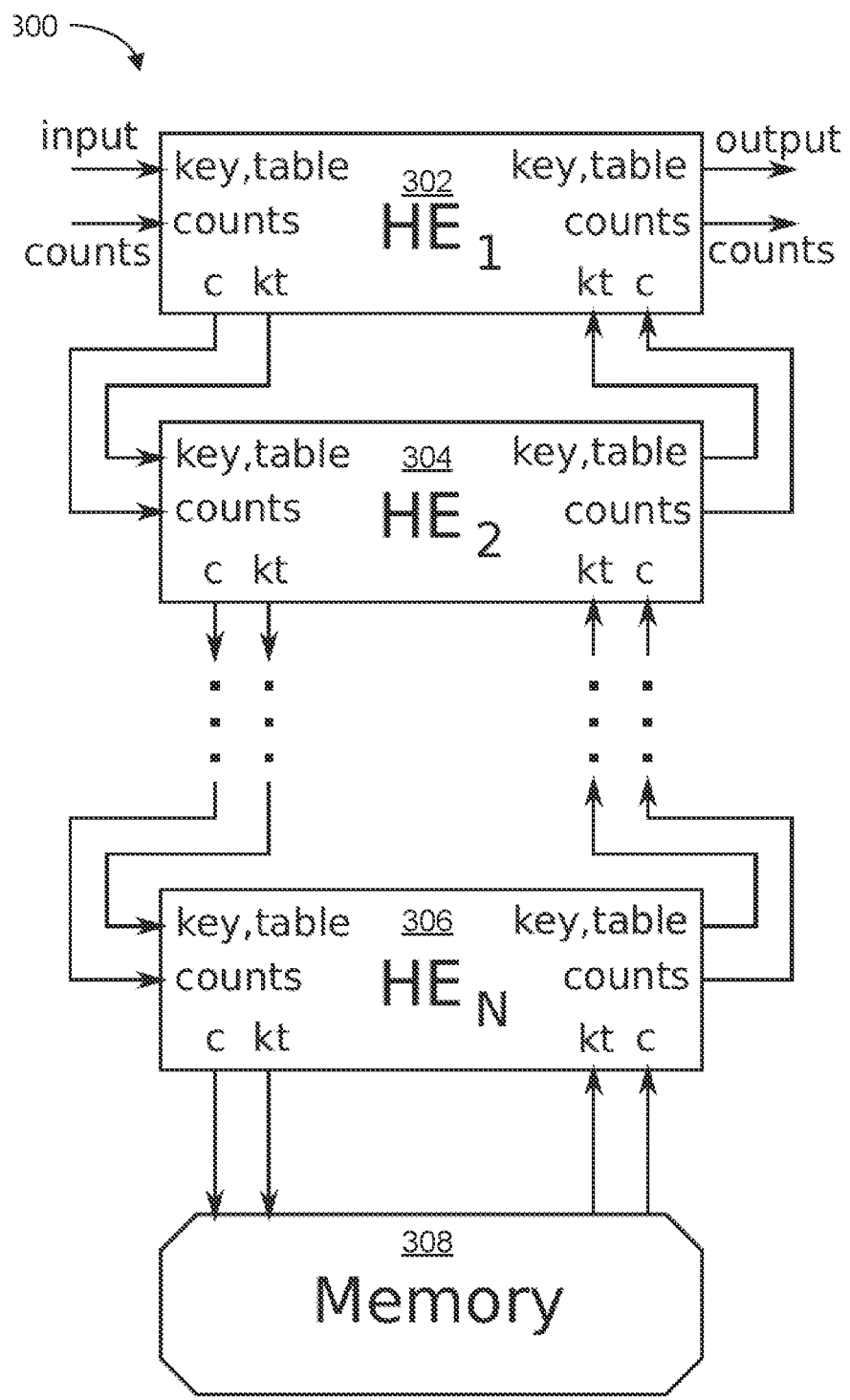
FIG. 3 is a schematic diagram of a system of histogram engines in accordance with an embodiment of the present disclosure.

Referring now to FIG. 3, a schematic diagram of an example system 300 for data histogram generation is shown. The example system 300 comprising N histogram engines (HE) 302, 304, 306 that are chained together such that the output of each histogram engine is connected to a next histogram engine down the chain, as shown along the left-hand side of FIG. 3. For example, output of $HE_1$ 302 is provided as input to $HE_2$ 304, and the output of $HE_2$ is provided to $HE_3$ (not shown), until eventually the last histogram engine $HE_N$ provides its output to memory 308.

Further, the output of each histogram engine of the example system 300 is also connected to the input of the previous histogram engine up the chain as shown along the right-hand side of FIG. 3. For example, the memory 308 provides its output to input of $HE_N$, which provides its output to the previous $HE_{N-1}$ (not shown), and so forth up to the output of $HE_2$ which is provided to the input of $HE_1$.

In an input mode, the input is received at $HE_1$ 302 and processed as described previously with reference to FIGS. 1, 2A, and 2B with overflow data resulting from $HE_1$ 302 reclaiming slots being input to $HE_2$ 304, with overflow data from $HE_2$ 304 flowing to a next histogram engine in the chain until $HE_N$ 306 which transmits its overflow data to the memory 308.

In an output mode, once all of the input data has been processed, the results of data histogram may be calculated by essentially operating the system 300 in the reverse of the input mode in which the results from the outermost layers are fed back to the previous stages. For example, in the example system 300 shown in FIG. 3, stored {key, table, counts} records stored in the memory 308 are output as inputs to $HE_N$ 306. Once all the records in the memory 308 have been output, $HE_N$ 306 sends out all the stored {key, table, counts} records to the stage before it and so on until the first stage, $HE_1$ 302 outputs the stored {key, table, counts} results. Each of the histogram engines, $HE_1$ 302 to $HE_N$ 306, processes the input received from the previous device in the system 300 in this output mode the same way as the histogram engines, $HE_1$ 302 to $HE_N$ 306, process inputs from any external device as described previously with reference to FIGS. 2A and 2B.

To minimize computation requirements, records may be read out of each HE 302, 304, 306 in the order of the newest slot to the oldest slot. However, this is not necessary, and records can be read out of HEs in any order. The histogram calculation in the output mode is finished when all the {key, table, counts} records are sent out of $HE_1$ 302.

Each of the histogram engines 302, 304, 306 may be similar to the example histogram engine 100 described previously with reference to FIG. 1 and may be configured to perform the method described previously with reference to FIGS. 2A and 2B. Each of the N histogram engines of the system 300 can be implemented as either hardware or software, as described previously, depending on the availability of resources and the desired processing speed.

Because, in input mode, later stages of the system 300 receive input less frequently, the input being the overflow from earlier stages, the later stages do not have to process data as quickly as early stages, and can more easily be implemented as software implemented histogram engines in which storage resources are more abundant. The earlier stages, in which input data is received more frequently than at later stages, may be implemented as hardware implemented histogram engines in which input data may be processed more quickly.

The system 300 provides a multi-staged calculation of data histogram where the early stages are tuned for high-speed updates by, for example, implementing early stages with hardware implementation histogram engines, while the later stages are tuned for higher capacity by, for example, implementing later stages with software implementation histogram engines.

In storage constrained applications, our proposed method can be configured to collect the important aspects of the histogram, sacrificing measurement accuracy of non-important portions of the histogram. This is achieved by balancing the settings of histogram engine stages, final memory stage size, and how the slots are reclaimed. Given a fixed set of histogram engine configurations, reclaiming the oldest slots, i.e., least accessed slots, results in lower accuracy in tails, i.e., the low probability sections, of the distribution which may be desired in applications in which the peaks of the distributions are of interest, such as network traffic monitoring.

Conversely, reclaiming the most frequently accessed slots results in loss of accuracy in the peaks of the distribution, which may be desirable in applications in which the outliers of the distribution are of interest such as, for example, particle physics. Naturally, one can select the reclamation algorithm based on the statistical and temporal behavior of input keys to compute the histogram and put the emphasis on the accuracy of histogram measurements on desired section of the distribution.

The present disclosure describes a method and apparatus for generating a data histogram that utilizes a constrained linked-list to increase processing speed, and reclaims slots and nodes in the linked-list to create new nodes, sending the reclaimed data to an external device, to provide the capacity to generate data histograms for data that includes a large number, or even unbounded numbers, or unique keys. By selecting how slots are reclaimed, the method and apparatus of the present disclosure allows customized data histogram generation that emphasizes measurement accuracy for the most common keys in some applications, or the rarest keys in other applications. The method and apparatus of the present disclosure describes, during down times, reclaiming slots of a key storage memory so that slots are available for use during later bursts of incoming input in order to improve the histogram engine's processing speed by reducing the time spent reclaiming slots when processing the burst of input data, improving overall performance of the histogram engine.

The present disclosure also describes chaining histogram engines together to provide an iterative process for generating data histograms in way that may leverage the processing speed of hardware implemented histogram engines in earlier stages of the chain where data processing speed is more desired relative to storage capacity, and the storage capacity of software implemented histogram engines in later stages of the chain where storage capacity is more desired relative to processing speed.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method of generating a histogram at a histogram engine having a linked-list memory and key storage memory, the method comprising:
   receiving an input key;
   determining if a linked-list node associated with the input key exists in the linked-list memory;
   in response to determining that a linked-list node associated with the input key does exist in the linked-list memory, increasing at least one count stored in the linked-list node associated with the input key;
   in response to determining that a linked-list node associated with the input key does not exist in the linked-list memory, determining if an available slot exists in the key storage memory;
   in response to determining that an available slot does not exist in the key storage memory: determining a reclaimed slot in the key storage memory and a reclaimed node in the linked-list memory that is associated with the reclaimed slot;
   transmitting the data stored in the reclaimed slot in the key storage memory and the at least one count associated with the data stored in the reclaimed slot to an external device; and
   storing the key input in the reclaimed slot in the key storage memory and creating a new linked-list node associated with the reclaimed slot in the linked-list memory having at least one count.

2. The method of claim 1, wherein determining if a linked-list node associated with the input key exists comprises:
   performing a hash operation on the received input key to generate an input hash;
   determining a node address based on the input hash; and
   determining that a linked-list node for the input key exists when the node address of the input hash matches a stored linked-list node stored in the linked-list memory.

3. The method of claim 2, wherein the linked-list memory includes a linked-list root memory configured to store $2^s$ linked-list nodes, and wherein determining the node address based on the input hash comprising extracting s bits of the input hash, the extracted s bits of the input hash forming the node address, and the remaining bits of the input hash after extracting the s bits forming the remainder, and wherein determining that a linked-list node for the input key exists comprises determining that a linked-list node for the input key exists when the node address of the input hash matches a stored linked-list node stored in the linked list root memory.

4. The method of claim 3, wherein determining if a linked-list node for the input key exists in the linked-list memory comprises determining that a linked-list node exists if the remainder of the input hash matches a stored remainder in a node stored in the linked-list memory that is associated with the node address.

5. The method of claim 2, wherein receiving the key includes receiving the input key and an associated table value, and wherein performing a hash operation on the input key comprises concatenating the input key and table value and performing a hash operation on the concatenated input key and the table value to generate the input hash.

6. The method of claim 1, further comprising storing a sequence list in a sequence memory of the histogram engine, the sequence list indicating one or more of a sequence in which the slots of the key storage memory have been accessed, a sequence in which key frequency count value associated with the slots have been updated, and a slot having an associated key frequency count value that is higher than a key frequency count value of the other slots, and wherein the processor configured to determine the reclaimed slot comprises determining a reclaimed slot based on the sequence list.

7. The method of claim 1, further comprising storing a list of available slots in the key storage memory in an available slot memory of the histogram engine, wherein determining if an available slot exists comprises determining if any available slots are included in the list of available slots.

8. The method of claim 7, wherein in response to determining that no subsequent input keys have been received after a predetermined time period after receiving the input key:
   determining a plurality of slots of the key storage memory to reclaim;
   for each of the plurality of reclaimed slots, transmitting the data stored in the reclaimed slot in the key storage memory and the at least one count associated with the data stored in the reclaimed slot to an external device; and
   adding the plurality of reclaimed slots to the list of available slots stored in the available slot memory.

9. The method of claim 1, wherein:
   receiving the input key includes receiving the input key and at least one count value associated with the input key,
   increasing the at least one count stored in the linked-list node comprises increasing the at least one count stored in the linked-list node by the at least one count values, and
   creating a new linked-list node associated with the reclaimed slot in the linked-list memory having at least one count comprises setting the at least one count of the new linked-list node to the at least one count value.

10. The method of claim 1, wherein the external device is a second histogram engine or an external memory.

11. An apparatus for generating a data histogram, the memory comprising:
    a linked-list memory and a key storage memory;
    at least one processor configured to:
      receive an input key;
      determine if a linked-list node associated with the input key exists in the linked-list memory;
      in response to determining that a linked-list node associated with the input key does exist in the linked-list memory, increase at least one count stored in the linked-list node associated with the input key;

in response to determining that a linked-list node associated with the input key does not exist in the linked-list memory, determine if an available slot exists in the key storage memory;

in response to determining that an available slot does not exist in the key storage memory:
  determine a reclaimed slot in the key storage memory and a reclaimed node in the linked-list memory that is associated with the reclaimed slot;
  transmit the data stored in the reclaimed slot in the key storage memory and the at least count stored in the reclaimed node associated with the data stored in the reclaimed slot to an external device; and
  store the key input in the reclaimed slot in the key storage memory and creating a new linked-list node associated with the reclaimed slot in the linked-list memory having at least one count.

12. The apparatus of claim 11, wherein the at least one processor is configured to determine if a linked-list node associated with the input key exists comprises the at least one processor configured to:
  perform a hash operation on the received input key to generate an input hash;
  determine a node address based on the input hash; and
  determine that a linked-list node for the input key exists when the node address of the input hash matches a stored linked-list node stored in the linked-list memory.

13. The apparatus of claim 12, wherein the LL memory includes a linked-list root memory configured to store $2^s$ linked-list nodes, wherein the one or more processors configured to determine the node address based on the input hash comprises the processor being configured to extract s bits of the input hash, the extracted s bits of the input hash forming the node address, and the remaining bits of the input hash after extracting the s bits forming the remainder, and wherein the one or more processors configured to determine that a linked-list node for the input key exists comprises the one or more processors configured to determine that a linked-list node for the input key exists when the node address of the input hash matches a stored linked-list node stored in the linked-list root memory.

14. The apparatus of claim 13, wherein the one or more processors configured to determine if a linked-list node for the input key exists in the linked-list memory comprises the one or more processors being configured to determine that a linked-list node exists if the remainder of the input hash matches a stored remainder in a node stored in the linked-list memory that is associated with the node address.

15. The apparatus of claim 12, wherein the one or more processors configured to receive the key includes the one or more processors being configured to receive the input key and an associated table value, and wherein the one or more processors configured to perform a hash operation on the input key comprises the one or more processors being configured to concatenate the input key and table value and perform a hash operation on the concatenated input key and the table value to generate the input hash.

16. The apparatus of claim 11, further comprising a sequence memory, wherein the one or more processors are further configured to store a sequence list in the sequence memory, the sequence list indicating one or more of a sequence in which the slots of the key storage memory have been accessed, a sequence in which key frequency count values associated with the slots have been updated, and a slot having an associated key frequency count value that is higher than a key frequency count value of the other slots, and wherein the processor configured to determine the reclaimed slot comprises determining a reclaimed slot based on the sequence list.

17. The apparatus of claim 11, further comprising an available slot memory, the at least one processor further configured to store a list of available slots in the key storage memory in the available slot memory of the histogram engine, wherein the at least one processor configured to determine if an available slot exists comprises the at least one processor configured to determine if any available slots are included in the list of available slots.

18. The apparatus of claim 17, wherein the at least one processor is further configured to, in response to determining that no subsequent input keys have been received after a predetermined time period after receiving the last input key comprises the at least one processor configured to:
  determine a plurality of slots of the key storage memory to reclaim;
  for each of the plurality of reclaimed slots, transmit the data stored in the reclaimed slot in the key storage memory and at least one count associated with the data stored in the reclaimed slot to an external device; and
  add the plurality of reclaimed slots to the list of available slots stored in the available slot memory.

19. The apparatus of claim 11, wherein the at least one processor configured to receive the input key comprises the at least one processor configured to receive the input key and at least one count value associated with the input key, wherein the at least one processor configured to increasing the at least one count stored in the linked-list node associated with the input key comprises the at least one processor configured to increase the at least one count stored in the linked-list node by the at least one count value, and wherein the at least one processor configured to create a new linked-list node associated with the reclaimed slot in the linked-list memory having at least one count comprises the at least one processor being configured to set the at least one count of the new linked-list node to the at least one count value.

20. The apparatus of claim 11, wherein the external device is a second histogram engine or an external memory.

* * * * *